United States Patent [19]

Yamaguchi

[11] 4,443,043

[45] Apr. 17, 1984

[54] ELECTRIC MOTOR UNIT

[75] Inventor: Ryoji Yamaguchi, Tokyo, Japan

[73] Assignee: Tokyo Shibaura Denki Kabushiki Kaisha, Kawasaki, Japan

[21] Appl. No.: 411,959

[22] Filed: Aug. 26, 1982

[30] Foreign Application Priority Data

Sep. 9, 1981 [JP] Japan ............................. 56-142107

[51] Int. Cl.³ ............................................. F16C 39/06
[52] U.S. Cl. ................................. 308/10; 308/DIG. 1; 384/113; 310/90; 350/6.5
[58] Field of Search .................. 308/10, DIG. 1; 384/113, 115, 293, 109, 110, 111, 112; 350/6.5; 310/90

[56] References Cited

U.S. PATENT DOCUMENTS

| | | | |
|---|---|---|---|
| 3,150,822 | 9/1964 | Dreyfus | 384/115 |
| 3,612,630 | 10/1971 | Rosensweig | 308/10 |
| 3,614,181 | 10/1971 | Meeks | 308/10 |
| 3,851,933 | 12/1974 | Jacobson | 384/113 |
| 4,043,612 | 8/1977 | Orcutt | 308/10 |
| 4,072,370 | 2/1978 | Wasson | 308/10 |
| 4,200,344 | 4/1980 | Binns | 308/DIG. 1 UX |
| 4,211,452 | 7/1980 | Poubeau | 308/10 |
| 4,268,110 | 5/1981 | Ford | 350/6.7 |
| 4,310,757 | 1/1982 | Check | 350/6.7 |
| 4,332,428 | 6/1982 | Maruyama | 308/10 |

FOREIGN PATENT DOCUMENTS

| | | | |
|---|---|---|---|
| 2421853 | 11/1975 | Fed. Rep. of Germany | 308/10 |
| 2802712 | 7/1978 | Fed. Rep. of Germany | 308/10 |
| 47-6854 | 12/1972 | Japan | 308/10 |

OTHER PUBLICATIONS

Journal of J.S.M.E.; vol. 76; No. 650; 2/73 Kaneko et al.; Nippon Tel. & Tel. Publ. Corp.; Musashino Res. Ctr.

Primary Examiner—R. Skudy
Attorney, Agent, or Firm—Cushman, Darby & Cushman

[57] ABSTRACT

In a motor unit, a motor shaft is supported by a pair of journal bearings of a herringbone dynamic pressure type. A polygonal mirror is fixed to one end of the motor shaft, and a magnetic thrust bearing is arranged at the other end so that the motor shaft is suspended thereby. The magnetic thrust bearing is formed of ring-shaped first and second permanent magnets. The first permanent magnets are coaxially fixed to the motor shaft and each have one pole on their outer surfaces. The second permanent magnets are fixed to a motor housing, and have their inner surfaces opposed to the outer surfaces of the first permanent magnets. The inner surface of each second permanent magnet has a pole different from that of its corresponding first permanent magnet. The first and second permanent magnets attract one another so that the motor shaft is suspended by attraction.

6 Claims, 5 Drawing Figures

ELECTRIC MOTOR UNIT

BACKGROUND OF THE INVENTION

This invention relates to an electric motor unit, more specifically to an electric motor unit for rotating a polygonal mirror.

In general, an optical deflector of a polygonal mirror type is provided with a motor unit to rotate a polygonal mirror at high speed, e.g., scores of thousands of revolutions per minute. In such a motor unit, friction between a motor shaft and bearings need be minimized for high-speed rotation. To meet this requirement, there is proposed a motor unit of a tilting pad type as disclosed in Japanese Patent Publication No. 6854/78. In the motor unit of the tilting pad type, the motor shaft is radially supported by journal bearings of a dynamic pressure type, and is floated or suspended to be axially supported by a repulsive force produced between permanent magnets fixed individually to an end of the motor shaft and a motor housing. Having its motor shaft supported both radially and axially, this motor unit is fit for high-speed rotation, though it has the following drawbacks. Floated or suspended by the repulsive force between the pair of permanent magnets, the motor shaft is liable to vibrate due to external vibration or the like, as well as to become a little eccentric. Moreover, the arrangement of the permanent magnets along the axis of the motor shaft may lead to an increase in size of the motor unit.

The use of the motor unit involving these problems in the optical deflector of the polygonal mirror type will cause the following additional problems. Since the incidence position of a laser beam incident upon the polygonal mirror changes as the motor shaft vibrates along its axis, the width of the polygonal mirror must be great enough. Therefore, the polygonal mirror increases in cost and weight, so that rotatory load on the motor unit increases to reduce the starting capability of the motor unit. In a deflector so designed that the light reflecting surfaces of the polygonal mirror are at an angle to the axis of the motor shaft, the scanning rate of a laser scanned by the polygonal mirror varies as the incidence position of the laser beam is changed by the vibration of the motor shaft.

SUMMARY OF THE INVENTION

An object of this invention is to provide a motor unit capable of securely supporting a motor shaft in both radial and axial directions thereof.

Another object of the invention is to provide a motor unit capable of moving the motor shaft along its axis for adjustment of its axial position.

According to this invention, there is provided an electric motor unit having a magnetic thrust bearing. The magnetic thrust bearing is formed of ring-shaped first and second permanent magnets. The first permanent magnet is fixed to a motor shaft of the motor unit, and the second permanent magnet is fixed to a motor housing and disposed inside the first permanent magnet with a gap left between the two magnets. The first permanent magnet has one pole on its outer surface, and the second permanent magnet has on its inner surface a pole different from the pole on the outer surface of the first permanent magnet so that the first permanent magnet is attracted by the second permanent magnet. Thus, the motor shaft of the motor unit is suspended by attraction between the first and second permanent magnets.

DETAILED DESCRIPTION OF THE PREFERRED EMBODIMENT

Figure 1:
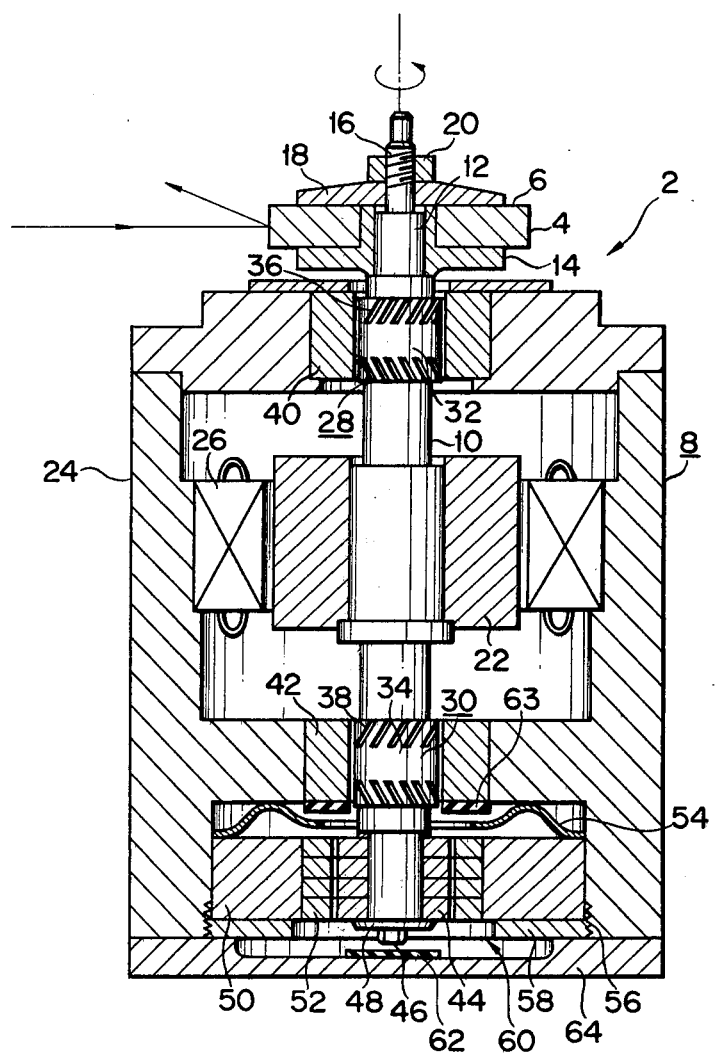
FIG. 1 is a sectional view schematically showing an optical deflector of a polygonal mirror type having an electric motor unit according to an embodiment of this invention.

In an optical deflector 2 of a polygonal mirror type, as shown in FIG. 1, a polygonal mirror 6 having, for example, eight light reflecting surfaces 4 is fixed to a motor shaft 10 of a motor unit 8. The polygonal mirror 6 is held between and adapter 14 mounted on a taper section at one end of the motor shaft 10 and a disk plate 18 mounted on a threaded section 16 of the motor shaft 10, and is fixed by tightening a nut 20 which is screwed on the threaded section 16. The threads formed on the threaded section 16 and the inner surface of the nut 20 are so designed that the nut 20 is tightened on the disk plate 18 as it is rotated opposite to the rotating direction of the motor shaft 10. Namely, the tightening direction of the nut 20 is opposite to the rotating direction of the motor shaft 10, so that the nut 20 is prevented from coming off the motor shaft 10 while the motor shaft 10 is rotating.

Like the motor shaft of a conventional motor, the motor shaft 10 is fixedly fitted with a rotor 22, which is surrounded by a stator 26 fixed inside a motor housing 24. Thus, the rotor 22 and the motor shaft 10 are rotated by the stator 26. The motor housing 24 is provided with journal bearings 28 and 30 which radially support the motor shaft 10 for rotation. The journal bearings 28 and 30 are of a herringbone dynamic pressure type. Herringbone grooves 36 and 38 are formed on supported sections 32 and 34, respectively, of the motor shaft 10, which are fitted in cylindrical bearings 40 and 42, respectively. Infinitesimal gaps of several microns are uniformly defined between the supported sections 32 and 34 and their corresponding bearings 40 and 42.

Figure 2:
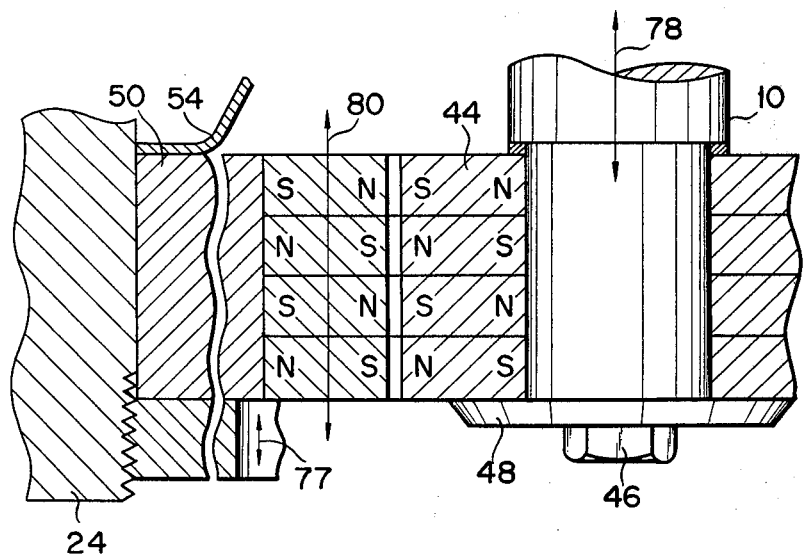
FIG. 2 is an enlarged view showing part of FIG. 1.
Figure 3:
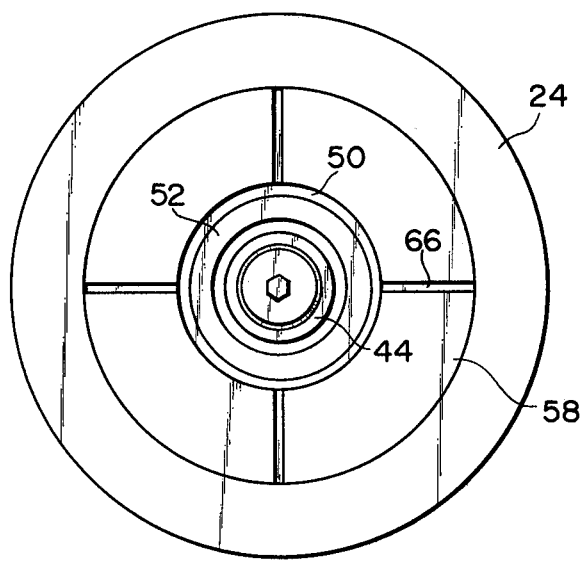
FIG. 3 is a bottom view of the electric motor unit shown in FIG. 1 cleared of a motor cap.

As shown in FIG. 2, four ring-shaped inner permanent magnets 44 with e.g. south and north poles on the outer and inner surfaces, respectively, are stacked and fixed to the other end portion of the motor shaft 10 by means of a disk member 48 and a bolt 46. A ring holder 50 is fitted in a recess at the bottom portion of the motor housing 24 so as to be slidable along the axis of the motor shaft 10. Fixed in the ring holder 50 are four ring-shaped outer permanent magnets 52 with e.g. north and south poles on the inner and outer surfaces, respectively. Located inside the outer permanent magnets 52 are the inner permanent magnets 44 fixed to the motor shaft 24. A uniform gap of several hundred microns is defined by the inner surfaces of the outer permanent magnets 52 and the outer surfaces of the inner permanent magnets 44. A Belleville spring 54 is interposed between the inner surface of the recess of the motor housing 24 and the ring holder 50. An adjusting ring 58 is screwed on a threaded section 56 formed on the inner surface of the recess of the motor housing 24 so that the ring holder 50 is pressed against the adjusting ring 58 by a force applied from the Belleville spring 54 to the ring holder 50, and is fixed to the motor housing 24. These members 44, 46, 48, 50, 52, 54, 56 and 58 constitute a magnetic thrust bearing 60 for suspending the motor shaft 10. A motor cap 64 is removably attached to the bottom portion of the motor housing 24, and a first damper 62 is attached to the inner surface of the motor cap 64, facing the bolt 46 screwed in the end of the motor shaft 10 suspended by the magnetic thrust bearing 60. Facing the inner permanent magnets 44, a second damper 63 is fixed inside the bearing 42. Formed on the outer surface of the adjusting ring 58, as shown in FIG. 3, are grooves 66 for screwing the adjusting ring 58 into the recess of the motor housing 24.

In the optical deflector of a polygonal mirror type described above, when electric power is supplied to the stator 26 of the motor unit 8, the rotor 22 and the motor shaft 10 supported by the journal bearings 28 and 30 are rotated. When the motor shaft 10 is rotated, the herringbone grooves 36 and 38 at the supported sections 32 and 34 allow the outside air to flow into the infinitesimal gaps between the supported sections 32 and 34 and the bearings 40 and 42 to produce an air flow therein. As a result, the pressure inside the infinitesimal gaps, especially the pressure at the regions over the central portions of the bearings 40 and 42, is increased, so that the motor shaft 10 is subjected to a radial force and supported by the pressure inside the gaps. In the magnetic thrust bearing 60, the ring-shaped outer and inner permanent magnets 52 and 44 attract one another. Namely, as shown in FIG. 2, the south and north poles on the outer surfaces of the inner permanent magnets 44 attract the north and south poles on the inner surfaces of the outer permanent magnets 52, respectively. Thus, the inner permanent magnets 44 are located in a balanced position which depends on the attraction between the permanent magnets 52 and 44 and the weights of the motor shaft 10 and the members thereon, so that the motor shaft 10 is kept suspended. Accordingly, the motor shaft 10 is in contact with nothing in both radial and axial directions thereof when it is rotated, and the polygonal mirror 6 is rotated at high speed.

Figure 4:
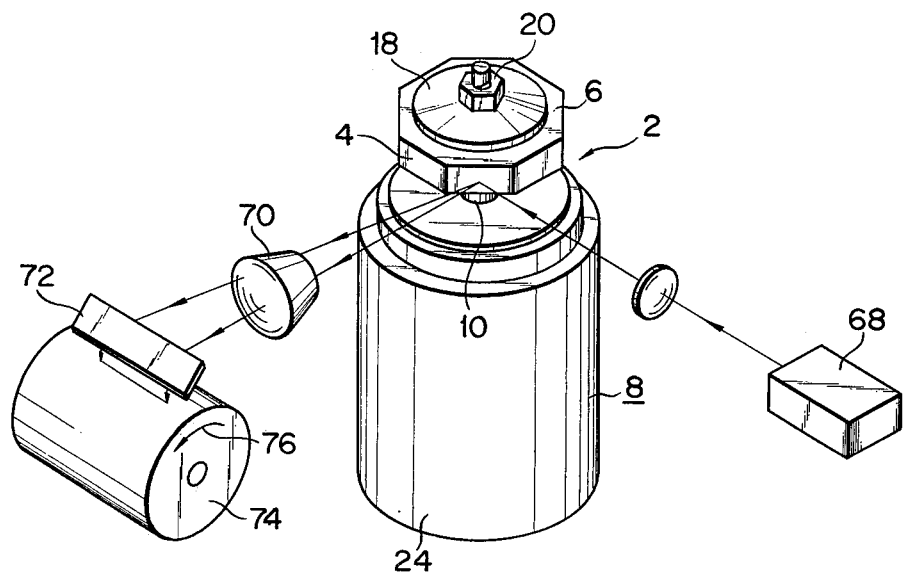
FIG. 4 is a schematic view of a printer system including the optical deflector shown in FIG. 1.

If incorporated in a printer system as shown in FIG. 4, the optical deflector 2 shown in FIG. 1 is used as follows. In the printer system shown in FIG. 4, a laser beam modulated in intensity by information or data is directed from a laser unit 68, such as a semiconductor laser, to the light reflecting surfaces 4 of the polygonal mirror 6 through a projection lens 70. Since the polygonal mirror 6 is quickly rotated by the motor unit 8, the laser beam reflected by the light reflecting surfaces 4 of the polygonal mirror 6 is deflected within a certain spread angle. The deflected laser beam is converged by a converging lens 70, and reflected by a mirror 72. The laser beam reflected by the mirror 72 is directed to a photosensitive drum 74 rotating in the direction indicated by an arrow 76 in FIG. 4. Thus, the photosensitive drum 74 is scanned with the laser beam, and a latent image is formed on the drum 74. In the system shown in FIG. 4, if the laser beam is directed to a position off the light reflecting surfaces 4 of the polygonal mirror 6, or is not directed to a desired region on the light reflecting surfaces 4, the motor shaft 10 of the motor unit 8 is axially moved in the following manner for elevation adjustment of the polygonal mirror 6. The motor cap 64 is removed from the motor housing 24, as shown in FIG. 3, and a tool, such as a screwdriver, is fitted in the grooves 66 of the adjusting ring 58 and turned in the direction to screw in or release the adjusting ring 58 as indicated by an arrow 77 in FIG. 2. Thus, the ring holder 50 is moved along the axis of the motor shaft 10 as indicated by an arrow 78. As the outer permanent magnets 52 fixed to the ring holder 50 are moved along the axis of the motor shaft 10 by the ring holder 50, the inner permanent magnets 44 held in the balanced position by the magnets 52 are also moved along the axis of the motor shaft 10, as indicated by an arrow 80. As a result, the motor shaft 10 fitted with the inner permanent magnets 44 is moved along its own axis to adjust the elevation of the polygonal mirror 6 so that the laser beam can be received on the desired region of the light reflecting surfaces 4. If the motor shaft 20 is excessively moved along its axis, or is suddenly moved along its axis by external impact while the motor unit 8 is being carried or in operation, then the inner permanent magnets 44 and the bolt 46 will run against the first and second dampers 62 and 63, respectively. Since the dampers 62 and 63 absorb the impact, however, the members of the motor unit 8 are prevented from being damaged.

Figure 5:
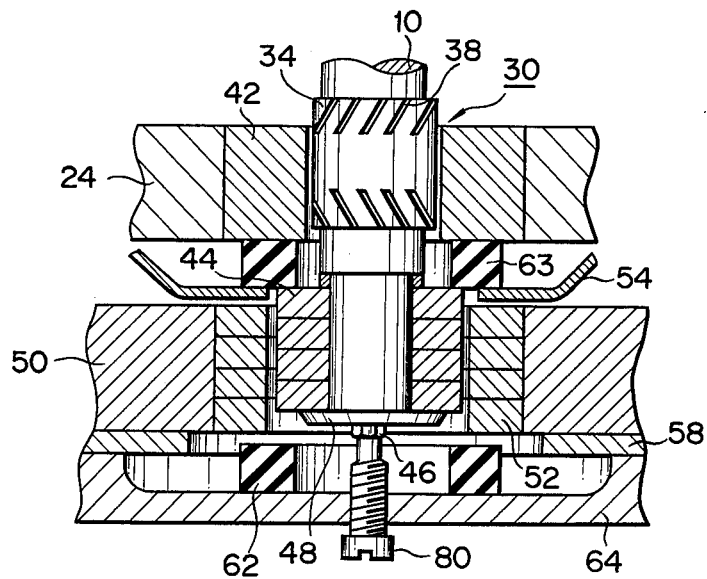
FIG. 5 is a partial enlarged view showing a modification of the motor unit shown in FIG. 2.

In order to prevent the members of the motor unit 8 from being damaged by the external impact applied thereto during the transportation of the motor unit 8, the motor cap 64 is preferably provided with a screw member 80 for fixing the motor shaft 10, as shown in FIG. 5. During the transportation of the motor unit 8, the screw member 80 is screwed in a thread section formed at the central portion of the motor cap 64 to be projected into the motor cap 64. Thus, the tip of the screw member 80 abuts against the bolt 46 which is fixed to the motor shaft 10. At this time, the motor shaft 10 is moved axially by the screw member 80, and the inner permanent magnets 44 are pressed against the second damper 63 which is fixed to the bearing 42. Thus, the inner permanent magnets 44 are fixedly held between the second damper 63 and the screw member 80. During the transportation, therefore, the motor shaft 10 is kept immovable in the motor unit 8. After the motor unit 8 is set in the system as shown in FIG. 4, the screw member 80 is loosened, the inner permanent magnets 44 are moved to the balanced position, and the motor shaft 10 is kept suspended.

In the embodiment mentioned above, the magnetic thrust bearing 60 is applied to a motor unit of a herringbone type. Alternatively, however, it may also be applied to a motor unit of a tilting pad type or of a floating bush type.

According to the motor unit of this invention, as described above, the motor shaft is axially supported by magnetic attraction, so that it hardly vibrates due to external vibration or becomes eccentric during rotation. Since the magnets for suspending the motor shaft are arranged in the radial direction of the motor shaft, the motor unit can be miniaturized.

What is claimed is:
1. An electric motor unit comprising:
a motor shaft;
a rotor fixed to the motor shaft;
a stator for rotating the rotor;
a pair of bearings for rotatably supporting both end portions of the motor shaft;
a housing to which the stator and the bearings are fixed;
a ring-shaped first permanent magnet with its inner peripheral surface coaxially fixed to the motor shaft and having one pole on its outer peripheral surface;

a second permanent magnet disposed coaxially with the first permanent magnet in the housing and disposed within the housing so as to be slidable along the axis of the motor shaft, having its inner peripheral surface opposed to the outer peripheral surface of the first permanent magnet, and having on its inner peripheral surface a pole different from the pole on the outer peripheral surface of the first permanent magnet so that the first permanent magnet is attracted by the second permanent magnet in the radial direction of the motor shaft; and means for adjusting the axial position of the second permanent magnet including a ring holder fixedly mounted with the second permanent magnet and slidably fitted in the motor housing, a screw member screwed in the motor housing to move the ring holder along the axis of the motor shaft, and an elastic member to press the ring holder against the screw member.

2. An electric motor unit according to claim 1, wherein said pair of bearings are dynamic pressure bearings of a herringbone type.

3. An electric motor unit according to claim 1, further comprising dampers for defining the range of axial movement of the motor shaft.

4. An electric motor unit according to claim 3, further comprising means for pressing the first permanent magnet fixed to the motor shaft against one of the dampers to regulate the axial movement of the motor shaft.

5. An electric motor unit according to claim 1, further comprising a polygonal mirror fixed to the motor shaft to be rotated therewith.

6. The electric motor unit according to claim 5, further comprising a holder for fixing the polygonal mirror to the motor shaft.

* * * * *